United States Patent
Blackwell

[15] 3,656,880
[45] Apr. 18, 1972

[54] UNIFORMLY DYED BLUE OR TURQUOISE WATER SWELLABLE CELLULOSIC FIBERS

[72] Inventor: John Blackwell, Kennett Square, Pa.
[73] Assignee: E. I. du Pont de Nemours and Company, Wilmington, Del.
[22] Filed: Nov. 25, 1969
[21] Appl. No.: 879,901

[52] U.S. Cl. .................................................. 8/21 C, 8/39
[51] Int. Cl. ........................................................ D06p 3/82
[58] Field of Search ............... 8/21 C, 39, 93, 174, 173, 21, 8/94

[56] References Cited

UNITED STATES PATENTS

| 2,828,180 | 3/1958 | Sertorio | 8/174 X |
| 3,164,436 | 1/1965 | Altermatt | 8/39 |
| 2,120,552 | 6/1938 | Ellis et al. | 8/93 X |

FOREIGN PATENTS OR APPLICATIONS

| 1,071,074 | 6/1967 | Great Britain | 8/21 C |
| 1,112,279 | 5/1968 | Great Britain | 8/21 C |
| 1,056,358 | 1/1967 | Great Britain | |

OTHER PUBLICATIONS

WAS White, Amer. Dyestuff Reporter, July 31, 1967, pages P591– P597 TP890A512
Cocket et al., " Dyeing of Cellulose Fibers & Related Processes," p. 291 Publ. by Academic Press, NYC, (1961) TP893C6.
C. C. Wilcock et al., " Whittaker' s Dyeing With Coal-Tar Dyestuffs," 6th Ed. 1964, p. 244 TP914W6
L. Peters et al., J. Soc. Dyers & Colourists, 73, 23 (1957)

*Primary Examiner*—George F. Lesmes
*Assistant Examiner*—T. J. Herbert, Jr.
*Attorney*—Louis H. Rombach

[57] ABSTRACT

Water swellable cellulosic fibers, for example, cotton, or blends or mixtures thereof with synthetic fibers, for example, polyester fibers, uniformly dyed to blue or turquoise shades with essentially water insoluble, nonvattable, 1,4-diamino-2,3-disubstituted anthraquinone dyes, for example, 1,4-diamino-2,3-bis(phenylthio)anthraquinone, said dyed fibers being fast to washing, dry-cleaning and crocking and having a reflectance color value (S') after scour of at least about 2.

3 Claims, No Drawings

UNIFORMLY DYED BLUE OR TURQUOISE WATER SWELLABLE CELLULOSIC FIBERS

BACKGROUND OF THE INVENTION

1. Field of the Invention

This invention relates to dyed water swellable cellulosic fibers and to dyed blends or mixtures of water swellable cellulosic fibers and synthetic fibers.

2. Description of the Prior Art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

1. A high molecular weight water insoluble dye is formed within the material, either by reacting two smaller components, as in he formation of an azoic dye by a coupling reaction, or by a chemical reaction which renders insoluble a soluble dye precursor, as in vat and mordant dyeing.
2. A water soluble preformed dye having an affinity for the cellulosic material is exhausted onto the material from an aqueous solution by a procedure which involves reducing the solubility of the dye in the aqueous solution, as with direct dyes.
3. A dye containing a substituent which reacts with the cellulose or a modified cellulose is exhausted onto the material from either an aqueous or non-aqueous solution under conditions such that the dye is chemically bonded to the substrate, as with fiber reactive dyes.
4. Water insoluble pigments are bonded to the cellulose with polymeric materials, as in pigment printing.
5. A finely divided form of water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pat. Nos. 396,692 and 2,069,215 and British Pat. No. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. No. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for cellulosic and for synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. No. 3,313,590. Analogous to the dyeing of such blends and confirming the aforesaid distinction between water swellable cellulosic materials and nonswellable cellulose acetate, U.S. Pat. No. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. No. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in commonly assigned, U.S. application Ser. No. 778,809, now abandoned in favor of continuation-in-part application Ser. No. 122,227, disclose a process for dyeing water swellable cellulosic materials with disperse dyes, which process comprises contacting a water swellable cellulosic material in any sequence with the following:

1. water in an amount sufficient to swell the cellulose;
2. a dye in an amount sufficient to color the cellulose, a boiling saturated solution of which dye in 0.1 Molar aqueous sodium carbonate exhibits an optical absorbance not in excess of about 30; and
3. a solvent in an amount sufficient to maintain swelling of the cellulose if water is removed, and which
   a. is at least 2.5 weight percent soluble in water at 25° C.,
   b. boils above about 150° C. at atmospheric pressure,
   c. is a solvent for the dye at some temperature in the range of about 0° to 225° C., and
   d. has the formula

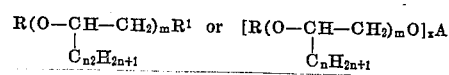

wherein
$n$ is 0 or 1;
$m$ is a positive whole number;
R is H, $C_{1-8}$ alkyl, $C_{7-15}$ aralkyl or alkaryl,

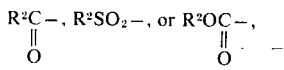

wherein
R² is C₁₋₈ alkyl, C₅₋₁₀ cycloalkyl, C₇₋₁₅ aralkyl or alkaryl, C₆ aryl, C₁₀ aryl, or furfuryl;
R¹ is —OH, —OR², —SR², —NHR², —NR²(C₁₋₈ alkyl), —NR²(C₇₋₁₅ aralkyl or alkaryl),

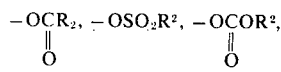

—NH(phenyl), or —NH(naphthyl), wherein R² is as defined above;
x is the number of unsatisfied valencies in A; and
A is ROCH₂CHORCH₂—, —CH₂CHORCH₂—,

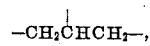

—CH₂C(CH₂OR)₃, (—CH₂)₂C(CH₂OR)₂, (—CH₂)₃CCH₂OR, (—CH₂)₄C, —CH₂(CHOR)ᵧCH₂OR, —CH₂(CHOR)ᵧCH₂—, or —CH₂(CHOR)ᵧ₋ᵤ(—CH)ᵤCH₂—in which y is 2, 3, or 4 and z is 0, 1, 2, 3, or 4 but not greater than y, and wherein R is as defined above;
provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

Conventional vat and disperse dyes can be used in the Blackwell et al. process, but most such dyes are unsatisfactory in commercial operations. The vat dyes usually provide only surface staining because they lack sufficient solubility in the Blackwell et al. solvents and do not penetrate the fiber. Such surface stains can be largely removed by aqueous detergent or drycleaning scour. The conventional disperse dyes, on the other hand, although they may penetrate the fiber, are sufficiently soluble in hot alkali to be removed during aqueous detergent scour.

OBJECTS AND SUMMARY OF THE INVENTION

It is an object of this invention to provide uniformly dyed fibers. A further object is to provide uniformly dyed water swellable cellulosic fibers and uniformly dyed blends or mixtures of water swellable cellulosic fibers and synthetic fibers. Still another object is to provide blue or turquoise uniformly dyed fibers which are fast to washing, drycleaning and crocking. Another object is to provide fibers which have been uniformly dyed with essentially water insoluble, non-vattable anthraquinone dyes.

The present invention resides in uniformly dyed, blue or turquoise, water swellable cellulosic fibers or blends or mixtures of water swellable cellulosic fibers and synthetic fibers, said dyed fibers being fast to washing, drycleaning and crocking and having a reflectance color value (S') of at least about 2 after one thorough scour in aqueous detergent at 90°–100° C. and one thorough scour in perchloroethylene at 50° C., and wherein said fibers the dye comprises the non-vattable anthraquinone dye having the formula

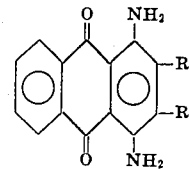

wherein both R groups jointly are

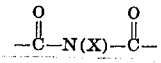

wherein X is benzyl, cyclohexyl or C₆₋₂₀ alkyl, or both R groups are the same and are selected from α-naphthylthio, phenylthio and phenylthio with 1–3 substituents selected from F, Cl, Br, NO₂, R₁, R₂, OR₁, OR₂, CO₂R₁, CON(R₁)₂, CONR₁R₂, NHCOR₁, NHCOR₂, SO₂R₁, SO₂R₂, SO₂N(R₁)₂ and SO₂NR₁R₂ wherein R₁ is C₁₋₈ alkyl, with a maximum of 12 carbon atoms derived from any plurality of R₁ groups, and R₂ is phenyl or phenyl with 1–2 substituents selected from C₁₋₄ alkyl, C₁₋₄ alkoxy, NO₂ and Cl.

DETAILED DESCRIPTION OF THE INVENTION

The above-defined, essentially water insoluble, non-vattable dyes which are used in the preparation of the dyed fibers of this invention are prepared by procedures well known in the art.

Blue 1,4-diamino-2,3-bis(phenylthio)anthraquinone dyes can be prepared by condensing 1,4-diamino-2,3-dichloroanthraquinone with two moles of a substituted thiophenol in an organic solvent, such as pyridine or dimethylformamide, using an alkali, such as caustic soda, to neutralize the acid formed. The reaction is very rapid in many instances, but decreases in facility with increasing electronegativity of any substituents which may be on the ring of the thiophenol. For example, trichlorothiophenol undergoes bis-condensation with 1,4-diamino-2,3-dichloroanthraquininone, but requires several days (at room temperature) before reaction is complete.

Examples of thiophenols that can be used to prepare blue dyes which are useful in the present invention are given in Table 1.

TABLE 1

| | |
|---|---|
| thiophenol | trichlorothiophenol |
| o-, m- or p-thiocresol | 2,4-dichloro-3-thiocresol |
| thioxylenols | 4,6-dichloro-3-thiocresol |
| 4-n-octylthiophenol | p-fluorothiophenol |
| o-methoxythiophenol | m-(methylsulfonyl)thiophenol |
| p-octyloxythiophenol | p-(methylsulfonyl)thiophenol |
| p-phenoxythiophenol | o- or p-nitrothiophenol |
| m-bromothiophenol | p-phenylthiophenol |
| p-chlorothiophenol | 2-mercaptobenzoic acid, isopropyl ester |
| 2-bromo-4-t.butylthiophenol | 3-mercaptobenzoic acid, cyclohexyl ester |
| 4-bromo-2-isopropylthiophenol | |
| 2-methyl-4-t.butylphenol | |
| o-ethylthiophenol | 4-mercaptobenzoic acid, methyl ester |
| 4-mercaptobenzoic acid, n-octyl ester | 4-chloro-2-thiocresol |
| 4-mercaptobutyranilide | 5-chloro-2-methoxythiophenol |
| 4-t.butyl-4'-mercaptobenzo-anilide | 6-methoxy-3-thiocresol |
| 2,6-dichlorothiophenol | 4-chloro-2,5-dimethylthio phenol |
| 2,5-dichlorothiophenol | 4-bromo-3-thiocresol |
| 4-methoxy-3-thiocresol | α-naphthalenethiol |
| 2-methoxy-4-thiocresol | 3-mercaptobenzoic acid |
| | 2-mercapto-5-chlorobenzoic acid |

The dyes formed from the thiophenol can be converted to sulfonamides by sulfonation and amination using conventional prior art procedures. Carbonamides can be prepared by utilizing carboxylated thiophenols in the condensation, followed by conventional amination.

Turquoise 1,4-diaminoanthraquinone-N-substituted-2,3- dicarboximide dyes can be prepared by reacting 1,4-diaminoanthraquinone-2,3-dicarboximide and an amine at a temperature of 100°-200° C. in a suitable organic solvent, such as Cellosolve, nitrobenzene-isopropanol or o-dichlorobenzene-methanol mixtures, or an excess of the amine itself. When low-boiling alcohols form part of the solvent system, the reaction is conveniently run in an autoclave in order to achieve the desired reaction temperature such as is taught in U. S. Pat. No. 2,628,963.

Examples of amines that can be reacted with 1,4-diaminoanthraquinone-2,3-dicarboximide to give turquoise dyes that are useful herein are benzylamine, n-hexylamine, cyclohexylamine, n-octylamine, t-octylamine, n-dodecylamine and n-octadecylamine.

The cellulosic materials which can be dyed with the aforesaid dyes by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with 10 percent aqueous caustic or the dyeing can be carried out in the presence of wetting agents, preferably of the nonionic type. Mixtures of cotton and rayon fibers can be dyed, and the dyes also can be used to dye purified wood pulp and paper. Excluded herein as the water swellable cellulosic material is cellulose acetate which does not exhibit the requisite swellability in the presence of water.

The synthetic materials which can be dyed with the aforesaid dyes include polyesters, polyamides, cellulose ethers and esters, and copolymers and mixtures thereof with other components intended to make them more easily dyeable or to add other desirable properties. The dyes can be applied to synthetic materials by conventional procedures, such as the Thermosol or aqueous dyeing procedures.

The dyes can be applied to water swellable cellulosic materials, or to blends or mixtures thereof with synthetic materials by the above-described Blackwell et al. process. The dyes are particularly useful for dyeing mixtures and blends of cotton and polyester or polyamide, such as mixtures containing 65 to 80 percent polyethylene terephthalate and 20 to 35 percent cotton. In such mixtures, the synthetic material is dyed using conventional process conditions. Since the aforesaid dyes can be used to dye both components in a blend or mixture, scourability as a factor in dye selection need not be considered since the cross-staining problem (requiring scouring) often encountered in prior art processes employing two different types of dyes has been minimized.

The dyes used herein dye the substrate directly, that is, they do not require oxidation, reduction, hydrolysis, or any other chemical modification for development of color or fastness. The dyes exhibit excellent fastness to crocking, washing and drycleaning.

In dyeing cellulosic materials using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye pad bath followed by squeezing to remove excess dry liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dye baths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dye baths used in practicing this invention also can contain dyes other than those described above; for example, direct dyes or fiber reactive dyes for cotton or for polyamides can be present for shading purposes.

In the preferred dyeing procedure herein, an aqueous dye dispersion and the organic solvent are applied to the fabric from a single padbath. The amount of water in the padbath usually is 70–95 percent weight percent and the solvent, 5–30 weight percent. The padded fabric is heated at 180°–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

As a quantitative measure of the shades obtainable on the fiber after scour, it is convenient to consider reflectance color value (S), as defined in British Pat. No. 1,056,358. The reflectance color value is given by the equation $$S = (L+M+N)$$

where $L$, $M$ and $N$ replace the well-known standard colorimetric values X, Y and Z set up by the CIE (Commission Internationale d'Eclairage). Whereas $$X, Y, Z = \int R\lambda E\lambda(\tilde{x},\tilde{y},\tilde{z})d\lambda \qquad (i)$$

(where $R\lambda$ = reflectance characteristic of the wave length
$E\lambda$ = radiation function of the illuminant and
$\tilde{x}$, $\tilde{y}$ and $\tilde{z}$ = CIE distribution coefficients which characterize a particular color), $$L, M, N = \frac{1}{K_o} \int F\lambda E\lambda(\tilde{x},\tilde{y},\tilde{z})d\lambda \qquad (ii)$$

(where $K_o$ = dyestuff concentration and $$F\lambda = \frac{(1-R\lambda)^2}{2(1-r)(R\lambda-r)}$$

where $R\lambda$ is defined above and $r$ = residual surface reflectance of the substrate when dyed completely black).

The sum of (L+M+N), as the terms are defined in equation (ii), is a constant for a given dye and independent of the concentration of dye on the substrate. In order to obtain values for (L+M+N) which are proportional to the shade depth of the dyed fabric, the concentration term $$\frac{1}{K_o}$$

has been removed from equation (ii); since it is desirable to obtain numbers in the 0–25 range, the values of the summation (L+M+N) have been further modified by dividing by 100. This new summation, as used herein and represented by S′, is related to S as defined in British Pat. No. 1,056,358 by the equation $$S' = \frac{K_c}{100} \times S$$

where K is as defined above.

A reflectance color value (S') of 2 represents a light but useful shade, that is, a dyeing rather than a mere staining of the fibers. It has been found that such shade depths are easily obtained on cotton with the dyes herein and, by increasing the concentration of dye in the padbath, shade depths of 10 times this figure can be achieved readily.

The dyes used in the present invention cannot be applied to cotton as vat dyes. In other words, they cannot be reduced to a water-soluble form, which has affinity for cotton from an aqueous solution, and then insolubilized within the cotton fibers by an oxidation step.

The following examples illustrate typical preparative procedures for the dyes used herein. Parts are given by weight.

EXAMPLE 1

Condensation of 1,4-Diamino-2,3-Dichloroanthraquinone With p1Tert.Butylthiophenol A mixture of 13.8 parts of 1,4-diamino-2,3-dichloroanthraquinone, 55 parts of dimethylformamide and 30 parts of p-tert.butylthiophenol was heated to 70° C. 36 Parts of 30 percent caustic soda were then added to the stirred mixture over a 20 minute period. After stirring for an additional 1 hour at 70° C., 50 parts of ethanol were added and the product was isolated by filtration. The wet cake was washed thoroughly with ethanol, water, and then again with ethanol, and dried. Thin layer chromatography on silica gel coated polyester plates (using benzene:acetonitrile = 19:1 as eluent) indicated a major blue component contaminated with a trace of a violet impurity, believed to be the mono-condensation product. A visible spectrum of the dye (in dimethylacetamide:water = 4:1) showed absorption maxima of comparable height at 595 and 635 m$\mu$, indicative of the structure for 1,4-diamino-2,3-(bis-p-t-butylphenylthio)-anthraquinone. Cotton is dyed in even blue shades when applied by the procedures illustrated in Examples 12 and 13.

EXAMPLES 2–9

Other dyes were prepared by essentially the same procedure as that described in Example 1 except that the thiophenols listed in Table 2 were employed. The dyes produced had structures which corresponded to that of the Example 1 product as modified to account for the use of the different thiophenols. All produce blue shades of good washfastness on cotton when applied by the procedures of Examples 12 and 13.

TABLE 2

| Example | Thiophenol |
|---|---|
| 2 | m-thiocresol |
| 3 | mixed thioxylenols |
| 4 | p-bromothiophenol |
| 5 | trichlorothiophenol |
| 6 | α-naphthalenethiol |
| 7 | 4-mercaptobenzoic acid, methyl ester |
| 8 | 3-mercaptobenzoic acid, cyclohexyl ester |
| 9 | 2-methyl-4-t.butylthiophenol |

EXAMPLE 10

Reaction of n-Octylamine With 1,4-Diamino anthraquinone-2,3-Dicarboximide

A slurry of 50 parts of 1,4-diaminoanthraquinone-2,3-dicarboximide in 400 parts of n-octylamine was heated under nitrogen at 100°–110° C. with stirring for 20 hours. The reaction mixture was then cooled externally to room temperature and diluted with 800 parts of isopropanol. The product was isolated by filtration and washed in turn with isopropanol, 2N-hydrochloric acid and water, and then dried. The dried cake (5 parts, 81 percent yield) showed a single blue band on thin layer chromatography, using chlorobenzene: pyridine:acetone = 96:2:2 as eluent. Anal. Calcd. for $C_{24}H_{25}O_4N_3$: C, 68.9; H, 5.9; N, 10.1. Found: C, 68.7; H, 6.0; N, 10.0. The dye had a melting point of 200°–202° C. and an absorptivity of 36.8 liters/gram/cm. Based on the above the dye has the structure corresponding to 1,4-diaminoanthraquinone-N-n-octyl-2,3-dicarboximide. The product dyes cotton in turquoise shades when applied thereto by the procedures of Examples 12 and 13.

Other alkyl amines having six to 20 carbon atoms can be used in the above process in place of n-octylamine to give turquoise dyes which are useful for preparing the dyed fibers of this invention.

EXAMPLE 11

Reaction of Benzylamine With 1,4-Diamino-anthraquinone-2,3-Dicarboximide

A mixture of 90 parts of 1,4-diaminoanthraquinone-2,3-dicarboximide, 140 parts of benzylamine, 650 parts of o-dichlorobenzene and 400 parts of methanol was heated with stirring in a steel autoclave at 165°–170° C. for 4 hours. After cooling to room temperature, the product, 1,4-diaminoanthraquinone-N-benzyl-2,3-dicarboximide, was isolated by filtration and washed with ethanol until the washings were almost colorless. The product melted at 290° C. Anal. Calcd. for $C_{23}H_{15}O_4N_3$: N, 10.56. Found: N, 10.27. Cotton is dyed in turquoise shades when it is applied thereto by the methods illustrated in Examples 12 and 13.

The following examples illustrate the manner in which the dyes described herein can be used to dye or print cellulosics and cellulosic-polyester blends.

EXAMPLE 12

Dyeing of 65/35 "Dacron" Polyester/Cotton Blend Fabric
a. A padbath was prepared containing

| | |
|---|---|
| blue dye paste (15% active ingredient) of Example 1 | 50 g. |
| purified vegetable gum thickener | 20 g. |
| methoxypolyethylene glycol (molecular weight 350) | 100 g. |
| water | to 1 liter |

A continuous length of 65/35 "Dacron" polyester/cotton fabric was padded at 60 percent uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80°–100° C., with a hold-up time of one minute, and then through an oven at 200°–210° C. with a hold-up time of 1.7 minutes. The hot, dry fabric was cooled to room temperature and rinsed for 1 minute each in sequence: in water at 20°–30° C., in water at 90°–95 C., in water containing 1 percent of an ether-alcohol sulfate detergent at 90°–95° C., in water at 90°–95° C. and in water at 20°–30° C. The material was dried and then scoured for 5 minutes in perchloroethylene at 50° C. The fabric was uniformly colored in a satisfactory union dyeing of the cotton and "Dacron" fibers.

b. Experiment (a) was repeated except that the following heating procedure was employed.

The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C., where the total contact time was about 90 seconds.

The above procedures were used for 100 percent mercerized cotton broadcloth, except that the padbath contained 150 grams per liter of methoxypolyethylene glycol (M.W. 350) and the curing temperature was reduced to 180° C. Using the procedure of Example 12(a), modified as described with respect to solvent concentration and curing temperature, a sample of cotton broadcloth was dyed a deep, uniform blue shade. After the material had been scoured in aqueous detergent and then in perchloroethylene at 50° C. for 5 minutes as described above, the dyed cloth had a reflectance color value of 7.77.

When the blue dye of Example 1 was replaced by the dye of Example 10 in the above procedure, the sample of cotton broadcloth was dyed to a deep turquoise shade which, after having undergone the detergent and perchloroethylene scours described above, had a reflectance color value of 5.8.

EXAMPLE 13

Printing of 100 percent Cotton Fabric

A cotton fabric was padded to about 70 percent pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

| | |
|---|---|
| blue paste (15% active ingredient) of Example 3 | 10 grams |
| purified natural gum ether thickener | 60 grams |
| water | 30 grams |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed.

A similar procedure to that in Example 13 was used to print polyester-cotton blends but the heating temperature was raised to about 200° C. The fastness results of such prints are comparable to those of fabric which is dyed with the same dyes by the procedure of Example 12.

The embodiments of the invention in which an exclusive property or privilege is claimed are defined as follows:

1. Blue or turquoise, uniformly dyed, water swellable cellulosic fibers or blends or mixtures of water swellable cellulosic fibers and synthetic fibers, said fibers being fast to washing, drycleaning and crocking and having a reflectance color value (S') of at least about 2 after one thorough scour in aqueous detergent at 90°–100° C. and one thorough scour in perchloroethylene at 50° C., wherein said fibers the dye comprises the non-vattable anthraquinone dye having the formula

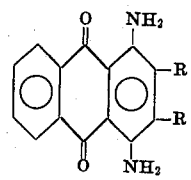

wherein both R groups jointly are

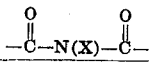

wherein X is benzyl, cyclohexyl or $C_{6-20}$ alkyl, or both R groups are the same and are selected from $\alpha$-naphthylthio, phenylthio and phenylthio with 1–3 substituents selected from F, Cl, Br, $NO_2$, $R_1$, $R_2$, $OR_1$, $OR_2$, $CO_2R_1$, $CON(R_1)_2$, $CONR_1R_2$, $NHCOR_1$, $NHCOR_2$, $SO_2R_1$, $SO_2R_2$, $SO_2N(R_1)_2$ and $SO_2NR_1R_2$ wherein $R_1$ is $C_{1-8}$ alkyl, with a maximum of 12 carbon atoms derived from any plurality of $R_1$ groups, and $R_2$ is phenyl or phenyl with 1–2 substitutents selected from $C_{1-4}$ alkyl, $C_{1-4}$ alkoxy, $NO_2$ and Cl.

2. The fibers of claim 1, the fibers being cotton.

3. The fibers of claim 1, the fibers being a blend or mixture of cotton and polyester fibers.

* * * * *

PO-1050
(5/69)

UNITED STATES PATENT OFFICE
CERTIFICATE OF CORRECTION

Patent No. 3,656,880            Dated April 18, 1972

Inventor(s) JOHN BLACKWELL

It is certified that error appears in the above-identified patent and that said Letters Patent are hereby corrected as shown below:

Column 10, lines 6-8 "cellulosic fibers or blends or mixtures of water swellable cellulosic fibers and" should read -- cellulose fibers or water swellable cellulose fibers blended with --.

Signed and sealed this 19th day of September 1972.

(SEAL)
Attest:

EDWARD M. FLETCHER, JR.            ROBERT GOTTSCHALK
Attesting Officer                  Commissioner of Patents